United States Patent [19]

Grimaldo

[11] 3,931,895
[45] Jan. 13, 1976

[54] COLLAPSIBLE TRAILER HOIST

[76] Inventor: Samuel Grimaldo, 776 W. Sandoval, Thousand Oaks, Calif. 91360

[22] Filed: Nov. 1, 1974

[21] Appl. No.: 519,988

[52] U.S. Cl. ............... 214/1 A; 214/505; 214/512; 214/85
[51] Int. Cl.² ..................... B67G 67/30; B60P 1/04
[58] Field of Search .......... 214/512, 505, 501, 85.1, 214/85, 1 A; 254/5 R, 5 B, 5 C; 187/8.71, 8.72, 8.41

[56] References Cited
UNITED STATES PATENTS

| | | | |
|---|---|---|---|
| 1,263,954 | 4/1918 | Sollender | 254/88 |
| 1,525,447 | 2/1925 | Hose | 214/1 A |
| 2,790,683 | 4/1957 | Clark | 187/8.72 X |
| 2,874,805 | 2/1959 | Jahnel | 187/8.72 |
| 2,929,519 | 3/1960 | Taylor | 214/505 X |
| 3,035,728 | 5/1962 | Hecker | 214/505 |
| 3,216,530 | 11/1965 | Hunter | 254/88 X |
| 3,294,367 | 12/1966 | Liskey | 254/88 |

*Primary Examiner*—Albert J. Makay
*Attorney, Agent, or Firm*—John E. Kelly

[57] ABSTRACT

A collapsible framework or chassis equipped on top with a trackway is mounted on a trailer which may be transported from place to place to assist in servicing vehicles. The framework may be alternately collapsed and maintained in a low profile during travel conditions and expanded to full height while supporting the vehicle on its trackway so that the underside of the vehicle can be serviced, e.g., muffler repair or installation. A control means first raises the front portion of the collapsible framework after the vehicle drives from a ramp onto the trackway and thereafter raises the rearward portion of the collapsible framework to thereby position the vehicle for servicing.

16 Claims, 9 Drawing Figures

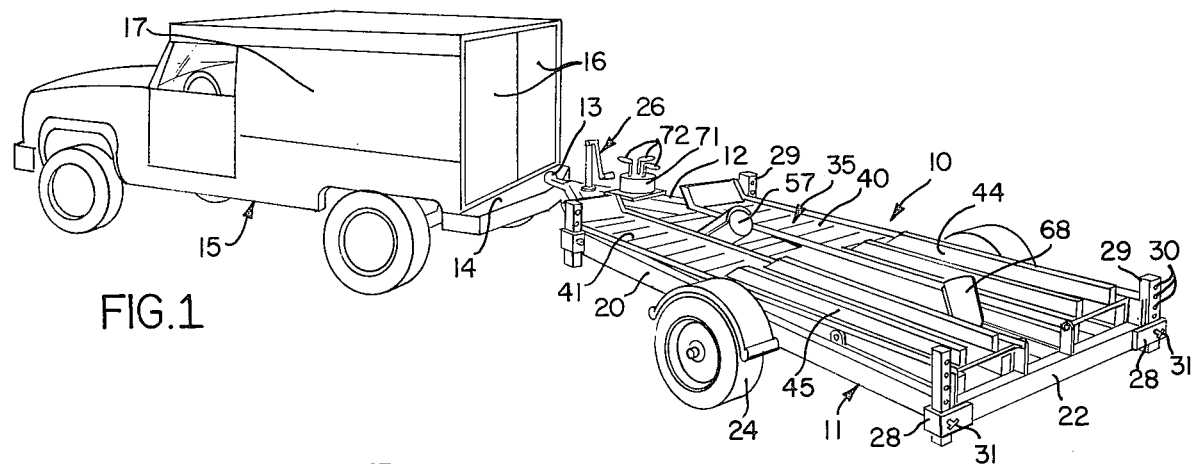
FIG.1
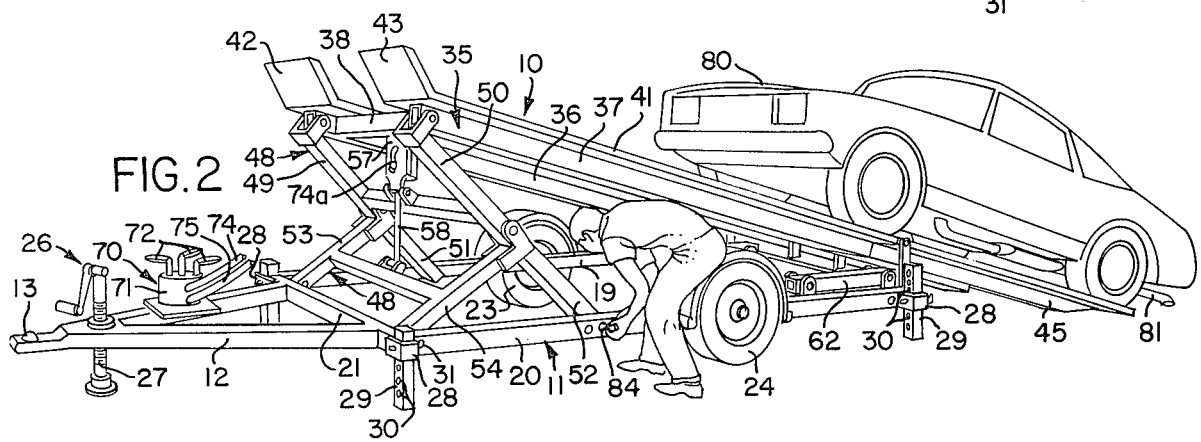
FIG.2
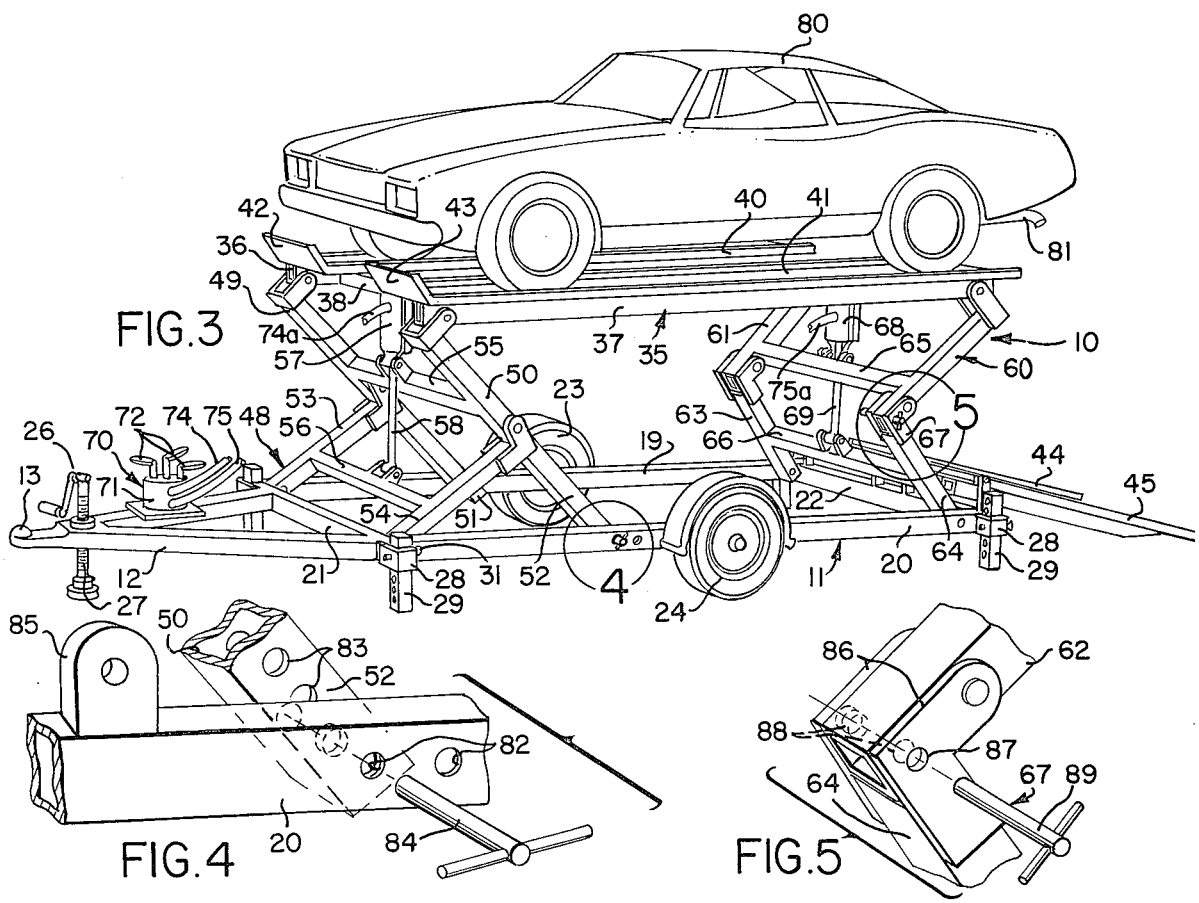
FIG.3
FIG.4
FIG.5

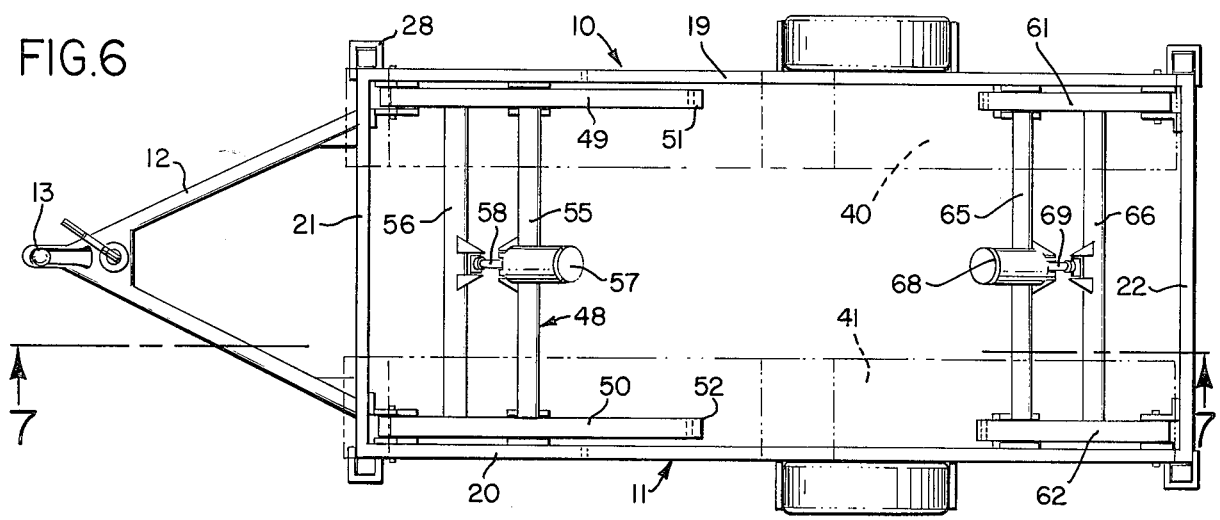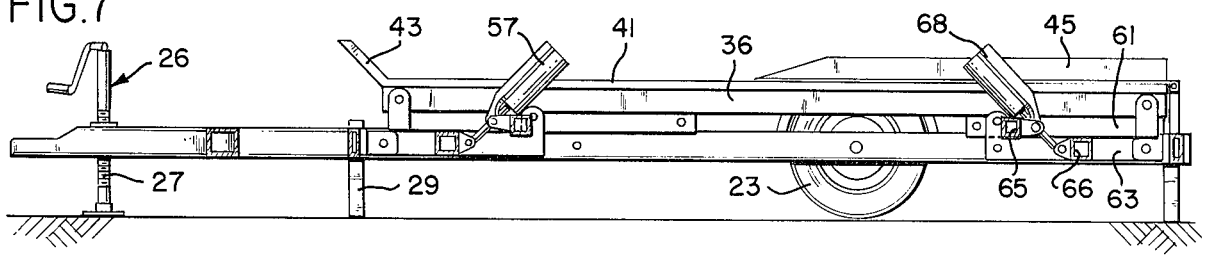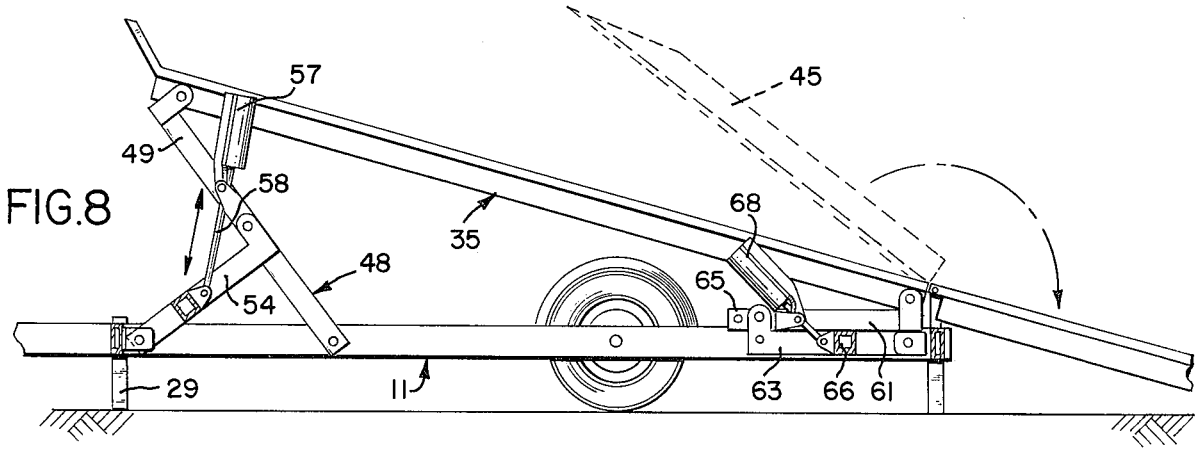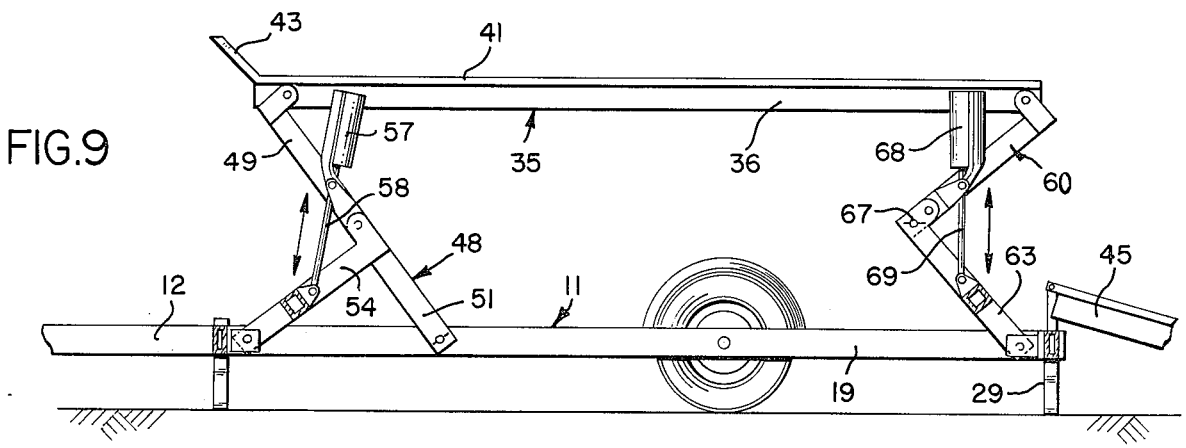

COLLAPSIBLE TRAILER HOIST

BACKGROUND OF THE INVENTION

This invention generally relates to vehicle servicing devices and more specifically to mobile trailers for hoisting automobiles to heights where access may be gained from beneath the automobiles for servicing purposes.

It is often desirable and sometimes necessary to service a vehicle at a location remote from a conventional service garage, automotive shop, gasoline station, etc. This is generally not practical or possible to achieve, however, because the special machines, equipment, accessories, etc. needed to perform the automotive services cannot be readily transported to remote sites.

When in addition the servicing requires access from beneath the automobile then the problem is even more acute, since ordinarily there is not any work pit, mechanical lift or elevated structure available.

While there are many types of repair work and installations that can be accomplished by reaching up into the undersides of an automobile, one particular kind involves either installing or repairing or otherwise servicing conventional automobile mufflers and exhaust systems.

Mobile frameworks for carrying or elevating automobiles are known and they are acceptable for some limited purposes.

A slightly portable automobile lift with a collapsible framework supported on casters is disclosed in U.S. Pat. No. 1,369,194 to Sarver (1921). A constantly maintained horizontal support framework can be expanded by a crank and pulley mechanism that is generally complicated, unreliable and time-consuming to operate. A trailer mounting a rigid framework for servicing the undersides of a vehicle is disclosed in U.S. Pat. No. 3,693,818 to Teagarden. The rigid framework rocks from one tilted position to another as the center of gravity of an automobile being driven overhead crosses the trailer wheels. The height of tracks on top of the rigid frame is fixed and cannot be lowered for travel conditions.

SUMMARY OF THE INVENTION

This invention comprehends a collapsible trailer hoist that may be conveniently towed by a service vehicle such as a mobile muffler truck to a location where an automobile requires muffler repair work or installation or any other automotive servicing, best performed by access from beneath the automobile. The hoist is durable, dependable, simply operated by one man and very handy for usage in the field or at remote locations.

In its broader aspects the collapsible trailer hoist has a wheeled main support and a movable support that is movable between a relatively lower position adjacent the main support and a relatively raised position above the main support. A collapsible front end frame interconnects front portions of the main support and the movable support. Similarly, a collapsible rear end frame interconnects rear portions of the main support and movable support. A control means operates to selectively and sequentially expand the front end frame and rear end frame. This action functions to lift the movable support to its raised position where access may then be gained by a workman or repairman to the undersides of an automobile parked on the movable support.

The control means includes an actuator, first mechanical expander coupled to the front end frame and a second mechanical expander coupled to the rear end frame.

The front end frame preferably includes a pair of laterally spaced elongated beams that are pivotally coupled to the movable support and have a set of normally free ends. A pair of laterally spaced short beams are pivotally coupled to the main support and are pivotally coupled to intermediate portions of corresponding elongated beams. When the front end frame is alternately collapsed and fully expanded, the elongated and short beams are generally parallel and mutually angled respectively. A mechanical expander associated with the control means interconnects and extends between a pair of cross beams, one secured between the elongated beams and the other secured between the short beams. Safety pins may be used to releasably lock the front end frame in its fully expanded or open position.

The rear end frame includes a first pair of laterally spaced beams pivotally coupled to the movable support. A second pair of laterally spaced beams are pivotally coupled to the main support. The first and second pairs of beams are pivoted together and may be releasably locked together.

A trackway is carried by the movable support and is characterized by a pair of laterally spaced tracks terminating in wheel stops at their forward ends. A pair of removable ramps extend rearwardly from corresponding tracks in order to facilitate movement of an automobile onto the tracks.

A hitch extends forwardly of the frame. A load regulating means is provided which includes a screw jack coupled to the hitch and a plurality of gravity jacks coupled to the main support. The gravity jacks assist in alleviating stress on the trailer wheels and axles that otherwise would be exerted from the load constituted by an overhead automobile being serviced.

The actuator of the control means is preferably a hydraulically operated motor and the mechanial expanders are preferably hydraulic cylinders. The hydraulic system would also include special holding valves which would not allow the hoist to return to the lowered position from the elevated working position and thereby would provide additional working safety.

The collapsible trailer hoist may be releasably coupled by way of the hitch to a muffler installation truck and towed from place to place for use in conjunction with the truck in repairing, installing, and otherwise servicing mufflers and exhaust systems.

BRIEF DESCRIPTION OF THE DRAWINGS

The numerous benefits and unique aspects of the present invention will be fully understood when the following detailed description is studied in conjunction with the drawings in which:

FIG. 1 is a perspective view of a collapsible trailer hoist constructed in accordance with this invention, shown in its collapsed position hitched to a muffler installation truck;

FIG. 2 is a perspective view of the collapsible trailer hoist, showiing its front end raised and a pair of ramps positioned;

FIG. 3 is a perspective view showing a vehicle fully raised by the collapsible trailer hoist so that its muffler may be serviced;

FIG. 4 is an enlarged, sectional and exploded view, showing the encircled portion 4 indicated in FIG. 3 and an alternative side locking element;

FIG. 5 is an enlarged, sectional and exploded view of the encircled portion 5 indicated in FIG. 3;

FIG. 6 is generally a top plan view of the collapsible trailer hoist with its overhead tracks shown in phantom lines;

FIG. 7 is a side elevational and longitudinally sectional view taken along lines 7—7 of FIG. 6;

FIG. 8 is a side elevational and longitudinally sectional view of the collapsible trailer hoist showing its front end expanded to a position as shown in FIG. 2; and, FIG. 9 is a side elevational and longitudinally sectional view of the collapsible trailer hoist fully expanded to a position as shown in FIG. 3.

DETAILED DESCRIPTION OF THE PREFERRED EMBODIMENT

Referring now to the drawings and in particular FIGS. 1, 2 and 3 a collapsible trailer hoist 10 constructed in accordance with this invention has a principal or main support 11 of rectangular configuration. Fixed to the front portion of main support 11 is a V-shaped hitch 12 that carries a conventional ball and socket coupling 13 for selective releasable connection to the rear portion 14 of a truck 15.

The truck 15 may be a muffler installation truck with a pair of rear doors 16 opening to a sheltered work area 17 in which is mounted a tube and muffler bending machine. The truck 15 would carry all necessary accessories such as welding equipment, hand tools, supplies, parts, etc. required to dismantle and install vehicle mufflers on location.

The main support 11 of the collapsible trailer hoist 10 has a pair of laterally spaced and longitudinally extending side members 19 and 20 interconnected at their forward and rearword portions by front member 21 and rear member 22. A pair of side wheels 23 and 24 are secured to the approximate mid sections of longitudinal side members 19 and 20 respectively.

Coupled to the front end of hitch 11 is a load regulating means 26 including a screw jack 27 which may be operated to assist in alleviating overhead loads that would otherwise be exerted directly on wheels 23 and 24. Other components of the load regulating means 26 include guide collars or members 28 fixed to the four corners of the rectangular frame of main support 11. Gravity jacks 29 are positioned for vertical travel within corresponding guide members 28. A series of vertically aligned locking apertures 30 is formed in each gravity jack 29 so that when a selected locking aperture is brought into registering alignment with a mating aperture of the guide member, then a locking element 31 may be inserted to fix the height of the corresponding corner section. The manner and sequence in which this is done shall be subsequently explained.

Positioned on main support 11 is a movable support 35 which can be shifted between a collapsed or lower position as shown in FIG. 1 and an expanded or raised position as shown in FIG. 3. The movable support 35 has a pair of laterally spaced and longitudinally extending side members 36 and 37 and an interconnecting front member 38. A track way assembly is carried by movable support 35 and includes a pair of laterally spaced tracks 40 and 41 that terminate at their forward ends in a pair of corresponding wheel stops 42 and 43. A pair of ramps 44 and 45 are associated with tracks 40 and 41. During travel conditions and times of inoperation, the ramps 45 may be stored within tracks 40 and 41. The ramps 44 and 45 may selectively be removed from their stored positions and extended rearwardly as shown in FIGS. 2 and 3. The ramps 44 and 45 may be pivoted to or simply detachably coupled to the rearward ends of their corresponding tracks 40 and 41. For improved traction reasons, the upper or usable faces of the tracks 40 and 41 and ramps 44 and 45 may be formed with ribs, cleats, etc.

A collapsible front end frame 48 interconnects front portions of the main support 11 and movable support 35. Front end frame 48 incorporates a pair of laterally spaced elongated beams 49 and 50 whose upper ends are pivotally coupled to the movable support side members 36 and 37. The other and generally lower ends 51 and 52 of the elongated beams 49 and 50 are free when the front end frame 48 is collapsed. A pair of laterally spaced short beams 53 and 54 are pivotally coupled to the main support side members 19 and 20 and are also pivotally coupled to intermediate sections of the elongated beams 49 and 50 respectively. An upper cross beam 55 rigidly interconnects elongated beams 49 and 50 and a lower cross beam 56 rigidly interconnects the short beams 53 and 54.

A mechanical expander 57 is coupled to the front end frame 48 and can be caused to selectively expand and collapse front end frame 48 to thereby simultaneously raise and lower the front portion of movable frame 35. Mechanical expander 57 is preferably a hydraulic cylinder pivoted to upper cross beam 55 and has a rod 58 pivotally connected to the lower cross beam 56.

A collapsible rear end frame 60 interconnects rear portions of the main support 11 and movable support 35. Rear end frame 60 includes a pair of laterally spaced beams 61 and 62 pivotally connected to movable frame side members 35 and 37. Another pair of laterally spaced beams 63 and 64 are pivotally connected to main support side members 19 and 20 respectively. The two sets of beams are mutually pivoted together and may be temporarily fixed together by way of a locking means 67 as shall be subsequently explained. An upper cross beam 65 rigidly interconnects beams 61 and 62 and similarly a lower cross beam 66 rigidly interconnects the other set of beams 63 and 64. A mechanical expander 68 is incorporated by rear end frame 60. The mechanical expander 68 is preferably a hydraulic cylinder pivotally coupled to upper cross beam 67 and a rod 69 is pivotally coupled to the lower cross beam 66. Mechanical expander 68 can be operated to expand or open the rear end frame 60 to simultaneously raise the rear portion of movable frame 35. The mechanical expanders 57 and 68 are identical in construction.

Referring now primarily to FIG. 3 the control means 70 is mounted on hitch 12 and includes an actuator 71 that is an hydraulically operated motor. A plurality of valve control levers 72 may be manipulated to operate the motor and cause it in turn to sequentially operate hydraulic cylinder 57 and hydraulic cylinder 68. A hydraulic line 74 extends from motor 71 to hydraulic cylinder 57 as indicated by inlet section 74a. Similarly, another hydraulic line 75 extends from motor 71 to hydraulic cylinder 68 as indicated by inlet section 75a.

With the ramps 44 and 45 extended rearwardly, as shown in FIG. 2, a vehicle 80 can be driven up the ramps 44 and 45 and onto the tracks 40 and 41. When the vehicle is securely positioned on the tracks 40 and 41 and the movable support 35 is fully expanded as shown in FIG. 3, then a mechanic or serviceman may gain access to the muffler 81 of vehicle 80.

As best shown in FIG. 4, a section of main support side member 20 is formed with locking holes 82 and the free or lower end 52 of beam 50 is similarly formed with transversely extending locking holes 83. When the front end frame 48 is sufficiently and selectively expanded, then the serviceman may insert a safety pin 84 through a registering set of locking holes to firmly hold the front portion of movable support 35 in its raised position. Alternatively, a side lug 85 may be used.

Referring primarily to FIG. 5, the pair of elbow plates 86 fixed to beam 64 are formed with locking holes 87. Corresponding locking holes 88 are formed in the butt end of beam 62 so that when these locking holes are forced into registering alignment by expansion of rear end frame 60, then the safety pin 89 may be inserted. The locking means 67 operates to prevent movement between the pair of beams 61 and 62 and other pair of beams 63 and 64 when the rear portion of movable support 35 is in its raised position.

OPERATION

Keeping the above construction in mind, it can be understood how many of the previously described disadvantages of conventional trailers for servicing automobiles and other vehicles are overcome or substantially eliminated by this invention.

The collapsible trailer hitch 10 of this invention may be towed by a mobile muffler truck 15 to any location where a vehicle 80 may normally travel, e.g., buildings, roadsides, fields, etc.

During travel situations, the comprehensive collapsible framework constituted by the movable support 35, the front end frame 48 and the rear end frame 60, is maintained in a low-slung, collapsed position which makes it stable and easy to maneuver. As shown in FIGS. 1, 6 and 7 the movable frame 35 is generally stacked on and partially nestled within the main support 11. The mechanical expanders 57 and 68 project slightly upwardly between the tracks 40 and 41 and the ramps 44 and 45 are flipped upwardly and forwardly to lie on or within the tracks 40 and 41.

An automobile 80 may thereafter be serviced on location by the collapsible trailer hoist 10 in conjunction with the machines and equipment carried by the mobile muffler truck 15.

Once the mobile muffler truck 15 is stopped near the automobile 80 in need of servicing, the collapsible trailer hoist 10 is stabilized and prepared for use by way of operating the load regulating means 26. The load regulating means 26 functions to reduce excessive force that would otherwise be exerted on the wheels 23 and 24 and associated axles. The force is primarily distributed between the gravity jacks 29 which, during travel conditions, are maintained fully elevated so as to not strike or scrape the road or ground.

First the front section of the collapsible trailer hoist 10 is dipped and the rear pair of gravity jacks 29 are dropped and fixed in place by the height adjustment elements 31. Thereafter the screw jack 27 is operated to lift the front section of the collapsible trailer hoist 10 through a pre-determined distance so that the front pair of gravity jacks 29 can be dropped and set in place. With these four gravity jacks 29 being set at the corners of main support 11, the great majority, e.g., ninety percent (90percent) of the load anticipated from vehicle 80 will be shifted from the wheels 23 and 24 and their associated axles and the hoist in general will be prevented from wobbling.

The ramp 44 and 45 are deployed and arranged in alignment with tracks 40 and 41 and then automobile or vehicle 80 is driven over the ramps 44 and 45 and fully onto the tracks 40 and 41. The rearward or outermost ends of the ramps 44 and 45 may be more steeply pitched or angled to allow general shortening of the ramps 44 and 45. The motor 71 of control means 70 is actuated to cause mechanical expander of hydraulic cylinder 57 to fully open front end frame 48. The safety pins 84 are inserted to set front end frame 48 and prevent it from accidentally or prematurely collapsing. As indicated in connection with FIG. 4, the safety pins 84 may be inserted through corresponding locking holes 82 of the side member of alternatively through corresponding locking holes in upstanding lugs 85 fixed to the side members.

In order to accommodate automobiles with different lateral spacing between their wheels, the tracks 40 and 41 may be adjusted by laterally shifting them inwardly or outwardly on rollers, skids, guide ways or the like and then locking them in selected adjustable positions.

Instead of being pivotally or swivelly coupled to the ramps 44 and 45, the tracks 40 and 41 may be detachable and slidably carried by the tracks during travel conditions. Moreover, the ramps 44 and 45 may be constructed from telescoping sections for storage in more compact spaces.

With the front end frame 48 fully expanded, a motor 71 of control means 70 is again manipulated — this time to cause the rear hydraulic cylinder 68 to fully expand and fully open the rear end frame 60. When rear end frame 60 is fully opened or expanded, then safety pins 89 are inserted. With the hoist 10 fully opened or expanded, holding valves associated with control means 70 are operated so as to prevent the hydraulic cylinders 57 and 68 from collapsing. The hydraulic cylinders 57 and 68 may be purposely activated to collapse the hoist 10 at a selected time.

Access may now be had to the undersides of vehicle 80 enabling removal, replacement, servicing, etc. of the vehicle exhaust system 81. When servicing is concluded, then the above indicated steps may be reversed in order to return the automobile 80 to ground level and collapse the hoist 10 for transportation to a new location.

The hoist 10 has been described as a trailer for assisting in the servicing and maintaining of motor vehicles. The hoist 10 may also be satisfactorily employed for other purposes such as in the construction and maintenance of heavy equipment, boats, and other objects where lifting to a predetermined height is important or desirable. In addition, the hoist 10 may be used as a stationary working platform or mounted on rails or skids for shifting the hoist from one position to another.

From the foregoing it will be evident that the present invention has provided a collapsible and portable hoist in which all of the various advantages are fully realized.

What is claimed is:

1. A collapsible trailer hoist comprising:
    a. a main support;
    b. a movable support movable between a lower position adjacent the main support and a raised position above the main support;

c. a collapsible front end frame interconnecting front portions of the main support and movable support and including,
  c.1 a pair of laterally spaced elongated beams pivotally coupled to the movable support and having a set of normally free ends,
  c.2 a pair of laterally spaced short beams coupled to the main support and pivotally coupled to intermediate portions of corresponding elongatged beams, and
  c.3 an upper cross beam interconnecting the elongated beams and a lower cross beam interconnecting the short beams.
d. a collapsible rear end frame interconnecting rear portions of the main support and movable support; and,
e. control means operable to sequentially expand the front end frame and rear end frame to lift the movable support to its raised position, the control including a mechanical expander connected to and extending between the upper and lower cross beams of the front end frame, wherein when the front end frame is alternately collapsed and expanded, the elongated and short beams are generally parallel and mutually angled respectively.

2. The structure according to claim 1 wherein the control means includes:
  an actuator;
  a first mechanical expander coupled to the front end frame for selectively expanding and collapsing it and thereby simultaneously raising and lowering the front portion of the movable frame; and,
  a second mechanical expander coupled to the rear end frame for selectively expanding and collapsing it and thereby simultaneously raising and lowering the rear portion of the movable frame.

3. The structure according to claim 1 wherein:
  the main support includes a pair of side rails formed laterally therethrough with locking holes;
  the normally free ends of the elongated beams are formed with locking holes movable into registering alignment with the side rail locking holes when the movable support is in its raised position; and,
  removable safety pins are provided for insertion through the registering sets of locking holes to assist in holding the movable support in its raised position.

4. The structure according to claim 1 wherein the rear end frame includes:
  a first pair of laterally spaced beams pivotally coupled to the movable support; and,
  a second pair of laterally spaced beams pivotally coupled to the main support, the first and second pairs of beams being pivoted together.

5. The structure according to claim 4 wherein:
  the rear end frame includes an upper cross beam interconnecting the first pair of beams and lower cross beam interconnecting the second pair of beams; and,
  the control includes a mechanical expander connected to and extending between the upper and lower cross beams.

6. The structure according to claim 4 including:
  locking means for preventing movement between the first and second pairs of beams when the movable support is in its raised position.

7. The structure according to claim 1 including:
  trackway means carried by the movable support.

8. The structure according to claim 7 wherein the trackway means includes:
  a pair of laterally spaced tracks terminating in wheel stops at their forward ends.

9. The structure according to claim 8 including:
  a pair of ramps extending rearwardly from corresponding tracks to facilitate movement of a vehicle onto the tracks.

10. The structure according to claim 1 including:
  a hitch extending forwardly of the main frame.

11. The structure according to claim 10 including:
  load regulating means having a screw jack coupled to the hitch and a plurality of gravity jacks coupled to the main support.

12. The structure according to claim 11 wherein:
  the main support is of generally rectangular configuration and is supported on wheels; and,
  the load regulating means includes gravity jacks positioned at each corner of the main support and is operable to reduce the load on the wheels.

13. The structure according to claim 10 wherein the control means includes;
  an actuator in the form of a hydraulically operated motor;
  a first mechanical expander in the form of a hydraulic cylinder coupled to the front end frame for selectively expanding and collapsing it to thereby simultaneously raise and lower the front portion of the movable frame;
  a second mechanical expander in the form of a hydraulic cylinder coupled to the rear end frame for selectively expanding and collapsing it and thereby simultaneously raising and lowering the rear portion of the movable frame.

14. A collapsible trailer hoist comprising:
  a. a main support including a pair of side rails formed laterally therethrough with locking holes;
  b. a movable support movable between a lower position adjacent the main support and a raised position above the main support;
  c. a collapsible front end frame interconnecting front portions of the main support and movable support and including,
    c.1 a pair of laterally spaced elongated beams pivotally coupled to the movable support and having a set of normally free ends formed with locking holes movable into registering alignment with the side rail locking holes when the movable support is in its raised position;
    c.2 a pair of laterally spaced short beams coupled to the main support and pivotally coupled to intermediate portions of corresponding elongated beams;
  d. a collapsible rear end frame interconnecting rear portions of hte main support and movable support;
  e. removable safety pins provided for insertion through the registering sets of locking holes in order to assist in holding the movable support in its raised position; and,
  f. control means operable to sequentially expand the front end frame and rear end frame to lift the movable support to its raised position,
  wherein when the front end frame is alternately collapsed and expanded the elongated and short beams are generally parallel and mutually angled respectively.

15. The structure according to claim 14 including:

track way means carried by the movable support and having a pair of laterally spaced tracks terminating in wheel stops at their forward ends.

16. The structure according to claim 15 including: a pair of ramps extending rearwardly from corresponding tracks to facilitate movement of a vehicle onto the tracks.

* * * * *